United States Patent [19]
Malyon

[11] 3,846,686
[45] Nov. 5, 1974

[54] SERVO CONTROL SYSTEMS

[75] Inventor: Brian R. Malyon, Feltham, England

[73] Assignee: Selectro-Micro Company Limited, London, England

[22] Filed: May 8, 1973

[21] Appl. No.: 358,463

[30] Foreign Application Priority Data
May 9, 1972  Great Britain.................... 21476/72

[52] U.S. Cl................................. 318/349, 318/420
[51] Int. Cl. ........................................... H02p 5/06
[58] Field of Search ......................... 318/347–349, 318/417, 418, 420, 620, 663, 666, 428

[56] References Cited
UNITED STATES PATENTS
3,731,178  5/1973  Schwanemann................... 318/620

Primary Examiner—Robert K. Schaefer
Assistant Examiner—Thomas Langer
Attorney, Agent, or Firm—Mason, Mason & Albright

[57] ABSTRACT

A servo control system is disclosed in which a resistive arrangement is connected in series with an electric motor across a supply. The resistive arrangement is variable, to vary the voltage across the motor and therefore the speed of the motor. The resistive arrangement comprises a rotary potentiometer in which the two end terminals have been short-circuited.

4 Claims, 3 Drawing Figures

SERVO CONTROL SYSTEMS

BACKGROUND OF THE INVENTION

1. Field of the Invention

The present invention relates to servo control systems such as systems for controlling the speed of an electric motor.

2. Description of the Prior Art

In a previously proposed D.C. servo control system where it is desired to bring a driven member driven by a motor to a predetermined position, the voltage across the motor was manually controlled by a variable resistor in series with the motor. As the driven member approached the predetermined position the speed of the motor was progressively reduced by manually increasing the resistance in series with the motor. When the driven member reached the predetermined position the resistance in series with the motor was increased to such a value that further rotation of the motor ceased.

The disadvantage of this system is that there is no fine control of the motor at low speeds and that the motor is slow in running up from low speed to full speed and vice versa.

It is an object of the invention to control the running up and running down of the motor non-linearly to provide fine control at low speeds and a coarse but fast control for higher speeds.

SUMMARY OF THE INVENTION

According to the present invention there is provided a servo control system, comprising a supply source having a first terminal and a second terminal, a variable resistor having a first terminal, a second terminal and a variable tapping arm providing a third terminal, means short circuiting the first and second terminals of the variable resistor, an electric motor, and means connecting the variable resistor in series with the electric motor across the first and second terminals of the supply source.

According to the present invention there is further provided a servo control system, comprising a supply source having first and second terminals, a variable resistor having a first terminal, a second terminal and a variable tapping arm providing a third terminal, means short circuiting the first and second terminals of the variable resistor, a potential divider, having an intermediate tapping, means connecting the variable resistor and the potential divider in series across the first and second terminals of the supply, a tachometer, a motor, means mechanically coupling the motor and the tachometer, and means electrically connecting the motor and tachometer in series between the intermediate tapping of the potential divider and one said terminal of the supply, the tachometer being so electrically connected that its output produced when the motor rotates opposes the voltage energising the motor.

BRIEF DESCRIPTION OF THE DRAWINGS

Servo control systems embodying the invention will now be described, by way of example, with reference to the accompanying diagrammatic drawings in which.

DESCRIPTION OF THE PREFERRED EMBODIMENTS

Figure 1:
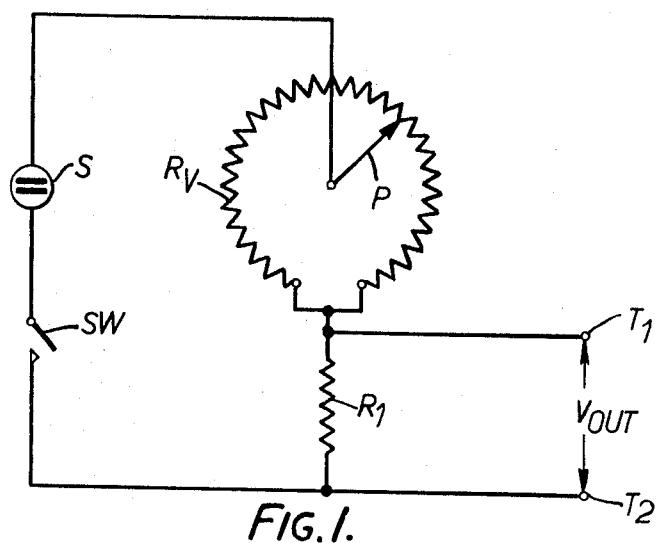
FIG. 1 is a circuit diagram of a servo control system embodying the invention.

As shown in FIG. 1, a rotary potentiometer Rv has its opposite end terminals short circuited. The short circuited end terminals are connected in series with a resistor $R_1$ and a switch SW to one terminal of a supply S while the rotary variable tapping arm P of the potentiometer Rv is connected to the other terminal of the supply S.

A pair of output terminals $T_1$ and $T_2$ are provided across the resistor $R_1$. A motor (not shown) can be connected across the output terminals. As can be seen from FIG. 3 the variation, with rotation of the potentiometer, in the resistance between the shorted terminals or the potentiometer and its tapping is non linear and has a peak value at 50 percent rotation.

Figure 3:
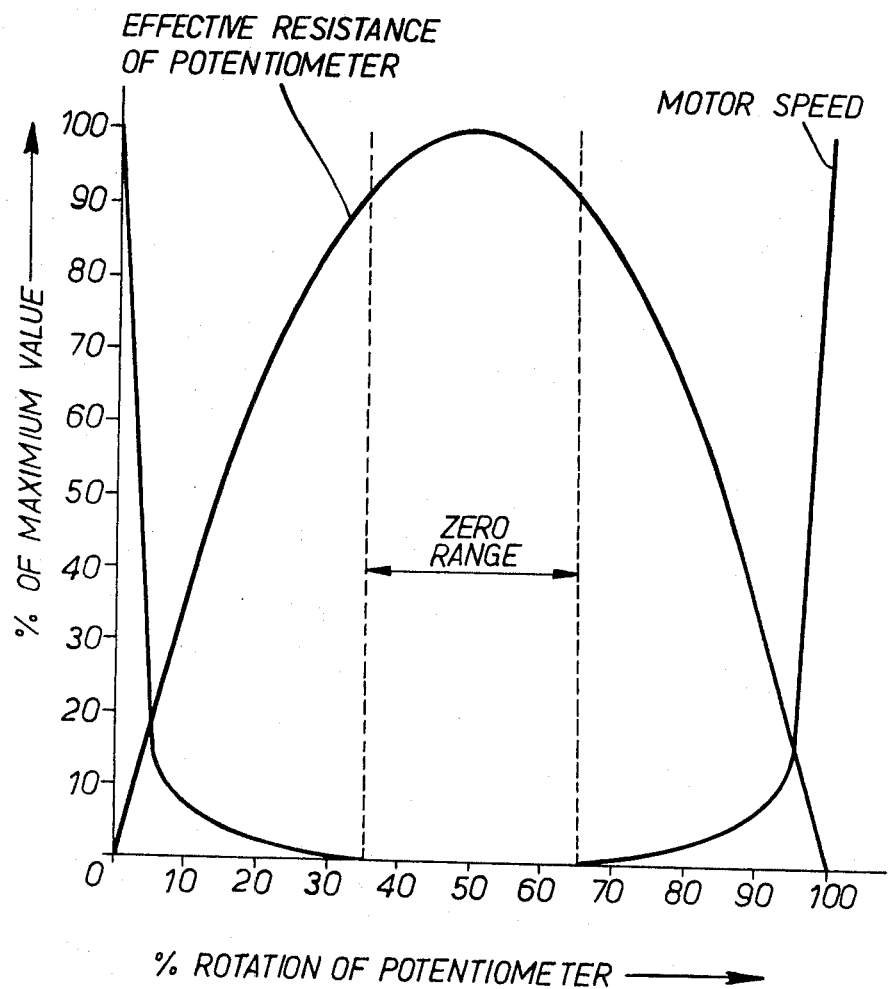
FIG. 3 shows a graph of the relationship of the rotation of a potentiometer and the speed of a motor controlled by the potentiometer, and a graph of the relationship of the rotation of the potentiometer and the resistance it provides in series with the motor.

As can be seen from the other curve shown in FIG. 3 if a motor is connected across the terminals $T_1$ and $T_2$, the motor speed will vary non-linearly with rotation of the potentiometer arm. Taking the arm P in its central position, rotation of the arm through 15 percent of its full rotation in either sense will be insufficient to start the motor running. Thereafter, rotation through a further 25 percent of full rotation will allow the motor to be brought up approximately linearly to just under 10 percent of full speed. Finally, rotation of the potentiometer arm through the remaining 10 percent of full rotation will take the motor very swiftly from just under 10 percent of full speed to full speed. The potentiometer thus acts as two resistors connected in parallel and variable in tandem in opposite senses.

The control system therefore enables rotation of the motor to be very finely controlled at low speed, and at the same time enables full speed to be very rapidly reached.

Figure 2:
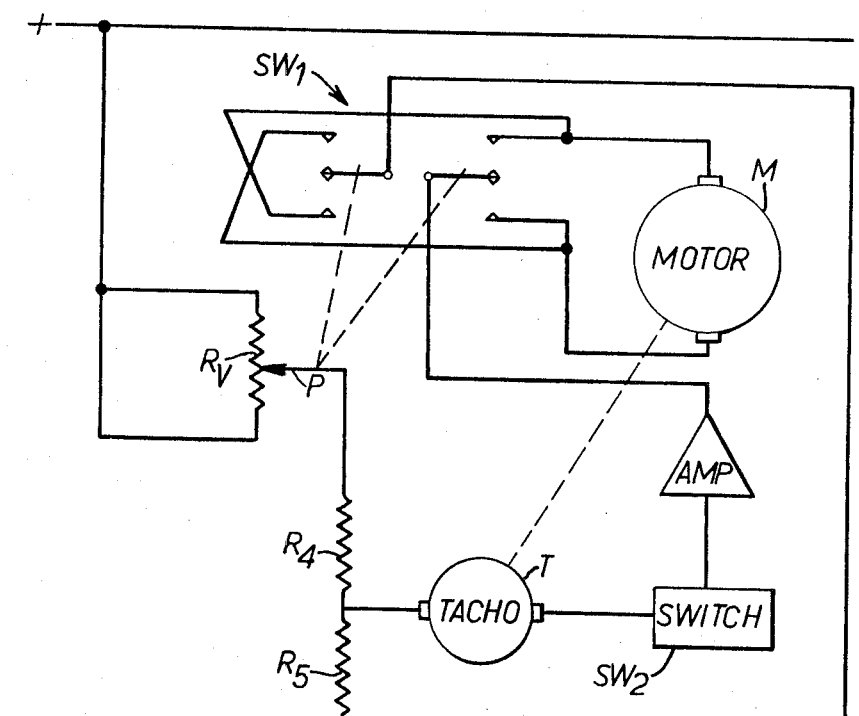
FIG. 2 is a circuit diagram of another servo control system embodying the invention.

FIG. 2 shows a full servo system. In FIG. 2 the short circuited end terminals of the rotary potentiometer Rv are connected to a positive supply line while the rotary arm P is connected via series connected resistors $R_4$ and $R_5$ to a negative supply line. The junction between the resistors $R_4$ and $R_5$ is connected to one terminal of a tachometer T while the other terminal of the tachometer feeds an electronic switch $SW_2$, for example of the threshold type which will become conductive only when a minimum threshold voltage is reached. The output of the switch supplies an amplifier which in turn feeds a motor M through a change-over switch $SW_1$. The switch is such that when one of its terminals is connected to the amplifier its other terminal is connected to the negative line.

The motor M is mechanically coupled to the tachometer T and the rotary arm P is mechanically coupled to the movable contacts of the change over switch $SW_1$.

The coupling between the arm P and the movable contacts of switch $SW_1$ is such that when the arm P is in a central position the changer over switch is open circuit, when the arm is rotated in one sense from the central position, the motor is connected in circuit to be driven in a forward sense, and when the arm is rotated in the opposite sense from the central position the motor is connected in circuit to be driven in the reverse sense.

In operation if it is desired to drive the motor fast in the forward sense, the arm P of the potentiometer is rotated in the appropriate sense to its fullest extent. Immediately a high voltage appears at the junction between resistors $R_4$ and $R_5$ and is communicated via the tachometer T to the switch $SW_2$. Since this high voltage is considerably above the threshold level of the switch $SW_2$, the switch $SW_2$ is tripped and the voltage is communicated via the amplifier to the motor M. The motor M, now receiving a high input voltage, has a high starting torque and quickly builds up to full speed. As the speed of the motor increases the input voltage to the motor is reduced by virtue of the voltage now generated by the tachometer which is in opposition to that driving the motor. As soon as full speed of the motor is reached steady state conditions prevail.

To slow the motor down the potentiometer arm P is manually rotated towards its central position. When the voltage at the junction between the resistors $R_4$ and $R_3$ reaches a sufficiently low value the threshold switch will trip out and so discontinue the supply of voltage to the motor M and accordingly the motor will halt.

To drive the motor in reverse the same procedure as described is repeated but instead the potentiometer arm P is rotated in the opposite sense.

It will be appreciated that the servo control system can be connected to an AC source and a variable voltage controlled AC motor used.

I claim:

1. A servo control system, comprising
a supply source having a first terminal and a second terminal,
a variable resistor having a first terminal, a second terminal and a variable tapping arm providing a third terminal,
means short-circuiting the first and second terminals of the variable resistor to provide a non-linearly variable resistance means between the short circuiting means and the third terminal,
an electric motor, and
means connecting the electric motor, the third terminal, and the short circuiting means all in series across the first and second terminals of the supply source so that the non-linearly variable resistance means is in series with the electric motor.

2. A servo control system, comprising
a supply source having first and second terminals,
a variable resistor having a first terminal, a second terminal and a variable tapping arm providing a third terminal,
means short circuiting the first and second terminals of the variable resistor, to provide a non-linearly variable resistance means between the short circuiting means and the first and second terminals and the third terminal,
a potential divider having first and second terminals and an intermediate tapping,
means connecting the third terminal of the variable resistor and the short circuiting means in series with the first and second terminals of the potential divider across the first and second terminals of the supply source,
a tachometer,
a motor,
means mechanically coupling the motor and the tachometer, and
means electrically connecting the motor and tachometer in series between the intermediate tapping of the potential divider and one said terminal of the supply source, the tachometer being so electrically connected that its output produced when the motor rotates opposes the voltage energizing the motor.

3. A system according to claim 2 including
a threshold switch,
an amplifier,
means connecting the threshold switch in series with the amplifier between the tachometer and the motor.

4. A system according to claim 2 including
a change-over switch for reversing the electrical connection of the motor in circuit with the tachometer, and
means mechanically coupling the variable tapping arm of the variable resistor to the change-over switch to connect the motor in circuit in one sense when the arm occupies a position in one half of the variable resistor and to connect the motor in circuit in the opposite sense when the arm occupies a position in the other half of the variable resistor.

* * * * *